US006153852A

United States Patent [19]

Blutke et al.

[11] Patent Number: 6,153,852

[45] Date of Patent: Nov. 28, 2000

[54] USE OF A CHEMICALLY REACTIVE PLASMA FOR THERMAL-CHEMICAL PROCESSES

[76] Inventors: Andreas S. Blutke, 2456 Alki Ave. SW., Apt. #303, Seattle, Wash. 98116-2253; Edward M. Bohn, 16713 Maplewild SW., Burien, Wash. 98166-3167; Robert S. Ottinger, 901 Grand View La., Aurora, Ohio 44202-8845; Michel G. Tuszewski, 2186-47th St., Los Alamos, N. Mex. 87544-1603; John S. Vavruska, 872 Don Cubero Ave., Santa Fe, N. Mex. 87501-4215

[21] Appl. No.: 09/249,657

[22] Filed: Feb. 12, 1999

[51] Int. Cl.[7] .......... B23K 10/00

[52] U.S. Cl. .......... 219/121.59; 219/121.43; 219/121.55; 219/121.48; 110/346; 315/111.21

[58] Field of Search .......... 219/121.59, 121.56, 219/121.55, 121.54, 121.52, 121.48, 121.43; 588/900, 901; 110/246, 346; 315/111.21, 111.51; 356/316

[56] References Cited

U.S. PATENT DOCUMENTS

| | | | |
|---|---|---|---|
| 4,482,246 | 11/1984 | Meyer et al. | 356/316 |
| 4,644,877 | 2/1987 | Barton et al. | 110/250 |
| 4,989,522 | 2/1991 | Cline et al. | 110/250 |
| 5,028,452 | 7/1991 | Beatty | 427/41 |
| 5,270,515 | 12/1993 | Long | 219/121.4 |
| 5,288,969 | 2/1994 | Wong et al. | 219/121.52 |
| 5,383,019 | 1/1995 | Farrell et al. | 356/316 |
| 5,611,947 | 3/1997 | Vavruska | 219/121.52 |
| 5,630,880 | 5/1997 | Eastlund | 118/723 MP |
| 5,681,434 | 10/1997 | Eastlund | 204/156 |
| 5,762,009 | 6/1998 | Garrison et al. | 110/346 |
| 5,770,922 | 6/1998 | Gerrish et al. | 315/111.21 |
| 5,907,221 | 5/1999 | Sato et al. | 315/111.51 |

OTHER PUBLICATIONS

Gunardson, Harold H.; and Abrardo, Joseph M. "Production of CO Rich Synthesis Gas." Air Products and Chemicals, Inc. Report. Undated. Allentown, PA. 18 pp.

Madsen Winter, Sandra; Rudbeck, Poul; Gauthier, Pierre; and Cieutat, Denis. "Advanced Reforming Technologies For Synthesis Gas Production." Haldor Topsøe A/S and Air Liquide Joint Report. Undated. pp. 287–304.

Bromberg, L; Cohn, D. R.; Rabinovich, A.; O'Brien, C.; and Hochgreb, S. "Plasma Reforming of Methane." Energy and Fuels. vol. 12. 1998. pp. 11–18.

*Primary Examiner*—Mark Paschall

[57] ABSTRACT

A method for optimizing the efficiency of an inductively coupled plasma (ICP) torch by varying at least one of a plasma gas flow rate and a power level applied to energize the ICP torch, and method and apparatus for efficiently using a $CO_2$ feed as both a reactant and for generating a thermal plasma to produce high value chemical feed stocks, such as a synthesis gas or carbon monoxide from low value feedstocks, such as methane or carbon.

56 Claims, 7 Drawing Sheets

USE OF A CHEMICALLY REACTIVE PLASMA FOR THERMAL-CHEMICAL PROCESSES

FIELD OF THE INVENTION

The present invention generally relates to a method and apparatus for using an inductively coupled plasma (ICP) torch to generate a chemically reactive plasma that reacts with a low value feedstock to produce higher value materials, and more specifically, to a method for optimizing the efficiency of an ICP torch, and to a method and apparatus for using a plasma stream as both a heat source and as a reactant in a thermal-chemical reaction process.

BACKGROUND OF THE INVENTION

Applications for plasma torches in the prior art have generally focused on the use of DC arc plasma torches to process bulk solid wastes and to destroy toxic wastes. The emphasis has been on waste volume reduction and destruction efficiency. ICP torches have been used primarily in plasma spraying for surface preparation and in the production of special materials (metal oxides and carbides) in low volume. To date, the emphasis on the applications of ICP torches has been plasma gas dynamics and material interactions in the plasma jet. Neither prior art relating to DC arc plasma torches, nor prior art relating to ICP torches has focused on maximizing the electrical-to-thermal energy operating efficiency of the plasma source involved in a process, but rather, has focused on the unique process advantages offered by these devices. In addition to the well-known uses for plasma torches, such torches are also well suited to provide the thermal energy required to drive many chemical reactions, for example, those used to produce commercially valuable materials such as carbon monoxide (CO) and synthesis gas (a mixture of hydrogen ($H_2$) and CO), and to also provide a highly excited reactant. The successful use of a chemically reactive plasma serving both as a reactant and as a source of heat to drive endothermic reactions for industrial applications requires good overall efficiency, with respect to both the operation of the plasma torch and the process that produces the desired product, to attain favorable process economics.

The two chemically reactive plasmas of primary interest for bulk thermal-chemical processes are steam and carbon dioxide ($CO_2$). The use of steam as a chemically reactive plasma, and an ICP torch that employs a steam plasma are disclosed in U.S. Pat. No. 5,611,947. In this patent, superheated steam is generated and passed through an induction coil to produce a high temperature steam plasma usable for the conversion and disposal of various types of feedstock streams in a reactor vessel. While this prior art reference recognizes that total flow rate through the reactor vessel is a function of the plasma gas flow rate, it does not address the issue of optimizing the process with regard to the operation and efficiency of the plasma torch and the yield or conversion efficiency of the process.

ICP torch operating efficiencies can range from less than 10% to greater than 85%, depending upon the plasma gas type and the selected operating parameters for the torch. To encourage the application of ICP torches in a wider variety of industrial processes, it is desirable to maximize the operating efficiency of these devices. Bulk industrial processes typically require power levels in the megawatts range, thus operating efficiency is a key economic factor. Accordingly, a method is needed for maximizing the efficiency of an ICP torch by determining and maintaining an optimal plasma gas feed rate and power level. It has been determined that both of these parameters can greatly impact on the operating efficiency of an ICP torch. For example, the plasma gas flow rate can impact the torch efficiency by as much as 30–40% at a given power level.

As noted above, an ICP torch can be employed in producing CO and synthesis gas, and improving the efficiency of this process is also of importance in promoting the use of ICP torches. Synthesis gas is used as a chemical feedstock for the production of a wide variety of chemicals such as alcohols, aldehydes, acrylic acid, and ammonia. Several references detail the different uses of synthesis gas and the different methods used to produce it. Two such articles that are specifically incorporated herein by reference are: "Production of CO Rich Synthesis Gas," by Harold Gunardson and Joseph Abrardo, Air Products and Chemicals, Inc., Allentown, Pa., and "Advanced Reforming Technologies for Synthesis Gas Production" by Sandra Winter Madsen and Poul Rudberk of Haldor Topsøe A/S, and Pierre Gauthier and Denis Cieutat of Air Liquide.

Several different processes are used conventionally to produce synthesis gas. Each process generates a different percentage mixture of $H_2$ and CO. Standard practice in the industry is to express the synthesis mixture as the ratio of $H_2$ to CO ($H_2$:CO). This ratio is very relevant in determining the kinds of products most appropriately produced from a particular synthesis gas. While there are methods to vary this ratio once the synthesis gas is produced, these ratio enhancement methods require additional investment in equipment and additional process steps.

Present commercial synthesis gas technology yields a product whose $H_2$:CO ratio varies from as high as 6:1 to as low as 3:2. There are some applications for synthesis gas in which excess $H_2$ is desired, but more frequently CO is the more useful component of synthesis gas and thus, a lower ratio is more desirable. For example, renewed interest by the chemical industry in the Fisher-Tropsch process for synthesizing liquid fuels, such as gasoline, represents a potentially large market for a synthesis gas in which the $H_2$:CO ratio is about 2:1. Additionally, market studies show that the demand for CO is likely to increase dramatically over the next 10 years. It would be desirable to develop a method for easily and efficiently producing synthesis gas with a higher CO content, preferably having a ratio of 2/1 or less. It would further be desirable to easily and efficiently produce synthesis gas with an $H_2$:CO ratio of 1:1, or to produce a pure CO stream by using an ICP torch to treat a carbon feedstock rather than an organic feedstock.

Conventional processes for synthesis gas production that are capable of achieving low $H_2$:CO ratios typically do so by using a $CO_2$ recycle technology in which a product gas has a $CO_2$ impurity removed ($CO_2$ is formed as a byproduct in conventional synthesis gas production as a result of oxidation reactions in the reaction vessel). The recovered $CO_2$ is then re-injected into the reaction vessel, yielding a synthesis gas having a low ratio. While this technique produces synthesis gas having lower ratios, it involves additional process steps and expense. It would be preferable to achieve a low $H_2$:CO ratio without the need to utilize a $CO_2$ recycle step in the process.

Conventional processes for producing synthesis gas are sensitive to contaminants in the feedstocks. For example, organic feedstocks often contain such high levels of sulfur that the sulfur must be removed prior to processing, because sulfur will poison the catalysts on which most commercial synthesis gas processes rely. Desulfurization involves additional process steps and expense. It would be desirable to produce synthesis gas from sulfur containing feedstocks without requiring pretreatment to remove the sulfur contaminant. An important aspect of this invention is a method that can easily produce synthesis gas without the need for the removal of contaminants such as sulfur from the feedstock.

Impurities are also introduced into the resultant synthesis gas stream in conventional processes as a byproduct of the reaction process. Steam reforming introduces $H_2O$ vapor and $CO_2$ that must be removed. Combustion-based reactions also introduce $H_2O$ vapor and $CO_2$, thus diluting the synthesis gas produced; and can also introduce nitrogen oxide ($NO_x$) emissions and soot, which are contaminants requiring removal. Again, removal of these contaminants involves additional process steps and expense. It would therefore further be desirable to produce synthesis gas efficiently without the need to provide for the removal of diluents, such as $H_2O$ vapor and $CO_2$, or contaminants, such as $NO_x$ and soot.

Process parameters can be changed in conventional processes for synthesis gas production to enable the ratio of $H_2$:CO to be varied, but only over a relatively narrow range. Large-scale changes in the $H_2$:CO ratio require the additional steps of ratio enhancement and/or separation of CO from $H_2$, representing added steps and expense. Furthermore, each specific conventional process to produce synthesis gas has a characteristic range of $H_2$:CO ratios that can be produced by that process. Before a synthesis gas production facility is constructed, it is critical to know what the desired $H_2$:CO ratio is, because the ratio desired would determine the process most suited to produce that ratio. Once the facility is constructed, adding ratio enhancement equipment to achieve different ratios is possible, but time consuming and expensive as well. Moreover, synthesis gas production facilities are often part of a larger petrochemical production facility, and the ratio of the synthesis gas required by such facilities can vary. It would be desirable to provide a method for producing synthesis gas capable of varying the $H_2$:CO ratio over a relatively wide range without the use of costly ratio enhancement techniques, so that synthesis gas production can be tailored to the varying needs of a site. The method should enable synthesis gas having a specific ratio to be produced simply by selectively introducing readily available reactants such as steam or $CO_2$, along with an organic feed or by changing the organic feed. For example, if higher $H_2$:CO ratios are desired, steam in the form of a plasma and/or feed reactant can be introduced. If lower $H_2$:CO ratios are desired, carbon dioxide in the form of a plasma and/or feed reactant can be introduced.

Finally, many conventional methods to produce synthesis gas rely on reaction vessels that operate under high pressure. Such vessels are often more costly to build and operate than vessels that operate at much lower pressures. Furthermore, reactants can only be introduced into such high-pressure reaction vessels at the elevated operating pressure. Accordingly, it would be preferable to produce synthesis gas in a reaction vessel that operates at relatively low pressures so it is not necessary to supply the feedstock at a high pressure.

SUMMARY OF THE INVENTION

In accord with the present invention, a method is defined for converting an organic feed into a tailored gas composition, using $CO_2$ as both a chemical reactant and as the gaseous fluid that is ionized to produce a thermal plasma. In this method, ionized $CO_2$ produced by the ICP torch and an organic feed are mixed in a reaction vessel to produce a higher value product, such as synthesis gas.

The method employs a plasma generator, a variable $CO_2$ gas supply system, a variable power supply connected to energize the plasma generator, a reaction vessel having an inlet adapted to receive a thermal plasma produced by the plasma generator and an outlet from which a product is collected, and a variable organic feed supply system adapted to inject the organic feed into the reaction vessel.

$CO_2$ is supplied to the plasma generator and ionized to produce the thermal plasma that is injected into the reaction vessel. The organic feed is injected into the reaction vessel to react with the ionized $CO_2$. In this process, the $CO_2$ acts not only as a thermal source when ionized to produce the thermal plasma that provides energy to drive an endothermic reaction, but is also a reactant in this reaction. $CO_2$ is readily available and is significantly less costly than other plasma gases, such as argon.

A plurality of different reactions can be carried out using $CO_2$ as a plasma gas that reacts with an organic feed. The organic feed can be a gas, a liquid, a solid or any combination thereof. The reaction of $CO_2$ with a hydrocarbon generates synthesis gas. The resulting synthesis gas product will have low levels of $H_2O$, $CO_2$, $NO_x$, and soot when the process is operated at or near equilibrium reaction temperatures.

Another application of the present invention uses $CO_2$ as a plasma gas to react with methane ($CH_4$), generating synthesis gas with a $H_2$:CO ratio of 1:1 without the use of a $CO_2$ recycle system and without the need for the removal of contaminants, such as sulfur, from the feedstock. Still another reaction uses $CO_2$ as a plasma gas in a reaction with methane to produce a synthesis gas of almost any desired $H_2$:CO ratio. The product ratio may be varied simply by introducing steam along with the organic feed. Another reaction uses $CO_2$ as a plasma gas in a reaction with carbon to generate a pure CO stream. Yet another reaction employs $CO_2$ as a plasma gas in a reaction with $H_2$ to produce CO.

All or part of the feedstock material can be mixed with the $CO_2$ before ionization by the plasma torch, instead of separately injecting the feedstock material into the reaction vessel. A portion of the (non-ionized) $CO_2$ can be injected into the reaction vessel along with the feedstock material, the additional $CO_2$ being supplied in sufficient quantity to completely react the feedstock material.

Preferably, the plasma generator is an ICP torch. A control device is provided to selectively control the $CO_2$ gas supply system, the power supply for the ICP torch, and the feedstock supply system. Optimal efficiency of the ICP torch can be achieved by selectively varying either the $CO_2$ gas supply system and/or the current supplied by the power supply to energize the ICP torch. The control system preferably includes a processor coupled with at least one sensor that measures torch efficiency. The processor for the control device can be programmed to adjust the $CO_2$ gas flow rate and the power level automatically to optimize the torch efficiency.

Alternatively, the control system can be configured to maximize the product yield from the reaction vessel by selectively varying the power level, the $CO_2$ gas flow rate, and/or the organic feed rate. The flow rates of the $CO_2$ gas required to maximize the product yield can be based upon the reaction between the ionized $CO_2$ produced by the ICP torch, the feedstock material, and any non-ionized $CO_2$ gas injected into the reaction vessel. Once these levels are determined, the control device can be employed to automatically vary the flow rates of the feedstock material and any additional non-ionized $CO_2$ gas flow into the reaction vessel to maximize the product yield from the reaction vessel.

A feedback sensor is preferably disposed at the outlet of the reaction vessel for monitoring the product yield from the reaction vessel. This sensor provides data to the processor, which through an appropriate software program, is used to monitor and automatically vary the feedstock material feed rate and the non-ionized $CO_2$ gas flow rate into the reaction vessel to optimize the product yield.

The processor is preferably programmed to selectively give priority to optimizing either the operating efficiency of the ICP torch, or the product yield from the reaction vessel. The operator can elect which of these efficiencies will have priority.

Another aspect of this invention is directed to an apparatus utilizing $CO_2$ as the plasma gas for a plasma generator. Preferably, the plasma generator is an ICP torch. In this apparatus, the $CO_2$ again serves both as a thermal source to provide energy to drive the endothermic reaction, and as a reactant in the process. This apparatus comprises elements that function in a manner generally consistent with the steps of the methods discussed above.

Yet another aspect of the present invention is directed to a method for optimizing an efficiency of an ICP torch by varying the plasma gas feed rate and the power level. Varying the plasma gas flow rate can impact the torch efficiency by as much as 30–40% at a given power level. In this method, a mathematical model describing the relationship among the frequency of the power source, the power applied to energize the ICP torch, the type of gas utilized for the plasma, the plasma gas flow rate, and the torch operating efficiency is provided. This model is used to determine optimum values of the plasma gas flow rate and the power level for a selected gaseous fluid that is ionized by the torch to generate the plasma.

Having determined the optimal levels of these variables according to the model, the ICP torch is operated using the optimal flow rate of the gaseous fluid, and the optimal power level applied to energize the induction coil of the ICP torch, while monitoring the efficiency achieved. The power level applied to the induction coil of the ICP torch and/or the flow rate of the gaseous fluid are then adjusted to attain an even greater efficiency, if possible. For example, once an adjustment has been made to one of these parameters that increases the efficiency, an adjustment to the other parameter is made to attempt to still further maximize the operating efficiency of the ICP torch.

Other parameters that affect torch efficiency are the gas type used, the radius of the torch, and the length of the torch. These parameters are generally fixed when the torch is designed. While many different types of gases can be ionized by the ICP torch to produce the plasma, a preferred gas is $CO_2$, due to the desirableness of the products, which can be generated by using a $CO_2$ plasma as both a heat source and a reactant. Other possible gaseous fluids that can be employed to generate the plasma include any ionizable gas such as air, oxygen, nitrogen, argon, steam, and any mixture of these gaseous fluids.

The model used to maximize the efficiency of an ICP torch can be beneficially incorporated in a method for maximizing a product yield from a reaction vessel in which plasma gas from an inductively coupled plasma (ICP) torch is reacted with a feedstock material in the reaction vessel. In this method, the model for maximizing the efficiency of an ICP torch is used to determine, for a particular gaseous fluid employed to generate the plasma, an optimal flow rate thereof, and an optimal power level for energizing the induction coil of the ICP torch to generate the plasma. The ICP torch is then operated using these optimal parameters determined by the model. Once the ICP torch has been adjusted to maximize the efficiency of the torch, the flow rate of the feedstock material is adjusted to achieve a maximum product yield.

To maximize the product yield, it can be necessary to add additional gaseous fluid to the reaction vessel in which the plasma is injected, as necessary to completely process all of the feedstock material. The product yield output from the reaction vessel is preferably monitored to control the parameters that affect the reaction.

Further increases in the product yield can be obtained by adjusting at least one of the power level applied to the induction coil, the flow rate of the gaseous fluid into the ICP torch, and the flow rate of the gaseous fluid into the reaction vessel. Changing the power level applied to the induction coil or the flow rate of the gaseous fluid into the ICP torch will affect the ICP torch efficiency. Depending on the preferences of the operator, priority can be given to either optimizing the operation of the ICP torch, optimizing the product yield of the reaction vessel, or some combination thereof.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Method for Utilizing $CO_2$ as both a Plasma Gas and a Reactant

Figure 1:
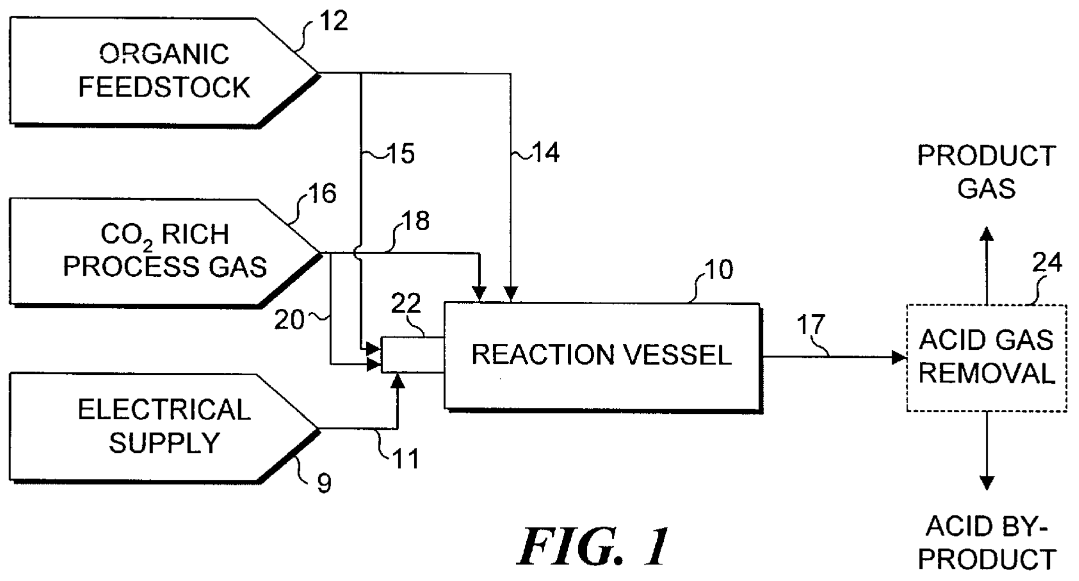
FIG. 1 is a view of a simplified process flow diagram for a $CO_2$ Conversion Reaction (CCR) process implemented in a reaction vessel with an ICP torch, in accord with the present invention.

One preferred embodiment of the present invention implements a CCR, uses $CO_2$ as a plasma gas, and reacts the plasma gas with a low value organic feedstock to produce higher value products. FIG. 1 illustrates a simplified process diagram for this method. A $CO_2$ rich process gas 16 is injected into an ICP torch 22 via a supply line 20. $CO_2$ rich process gas 16 can be pure $CO_2$ or a mixed gas stream, which contains a relatively high percentage of $CO_2$. Before a mixed gas stream is used, an analysis should be done to make sure that the non-$CO_2$ component of the mixture does not interfere with production of the desired product in a reaction vessel 10. A mixed gas stream is often available at a very low cost compared to a pure $CO_2$ stream, and though such a mixed gas stream can introduce impurities in the desired product, economics usually favor its use. The chemical reactions involved are straightforward, and one of reasonable skill in the art can easily analyze the overall reaction to determine the effect of the non-$CO_2$ component of such a mixed gas stream on the production of the desired product.

ICP torch 22 ionizes $CO_2$ rich process gas 16 and transfers the energy in the applied electromagnetic field of the coil to produce a current in the plasma gas, forming a plasma jet. The $CO_2$ plasma jet is injected into reaction vessel 10. An important aspect of the present invention is that in reaction vessel 10, the ionized $CO_2$ plasma serves both as a heat source that drives an endothermic chemical reaction with a feedstock, as well as a reactant with the feedstock in the chemical reaction.

A selected organic feedstock 12 is fed into reaction vessel 10 via a supply line 14 to react with the ionized $CO_2$ plasma. Depending on the resultant product desired, organic feedstock 12 can be substantially pure carbon solids (e.g., carbon black), liquid organics, or gaseous organics, such as methane ($CH_4$) or natural gas. If desired, additional $CO_2$ rich process gas can also be injected into the reaction vessel in an non-ionized state via a supply line 18, to provide sufficient $CO_2$ to ensure that all of organic feedstock 12 is processed. It should be noted that the maximum volumetric flow of $CO_2$ rich process gas 16 supplied to ICP torch 22 via supply line 20 to produce the plasma is limited by the ability of ICP torch 22 to ionize the gas flow. Consequently, it may be necessary to provide additional $CO_2$ rich process gas 16 to the reaction vessel via supply line 18.

It is also possible to inject organic feedstock 12 into the ICP torch via a supply line 15, instead of, or in addition to, injecting organic feedstock 12 into reaction vessel 10 via supply line 14. Note that as discussed above, ICP torch 22 has a maximum rated flow rate (the "throughput" of the torch) for a given plasma composition, and only a finite volume of $CO_2$ rich process gas 16 and organic feedstock 12 can be processed by the ICP torch. Those of ordinary skill in the art of chemical processing will easily be able to determine the amount of organic feedstock 12 that should be injected into the ICP torch, for a given chemical reaction, and given other variables of the process, such as the maximum rated flow rate of the ICP torch.

The product of the endothermic reaction exits reaction vessel 10 via an output line 17. Optionally, an acid gas removal unit 24 is coupled to output line 17. Acid gas removal unit 24 is only necessary if organic feedstock 12 includes contaminants such as sulfur or chlorine (which will be respectively converted into sulfuric acid or hydrochloric acid in reaction vessel 10).

Figure 2:
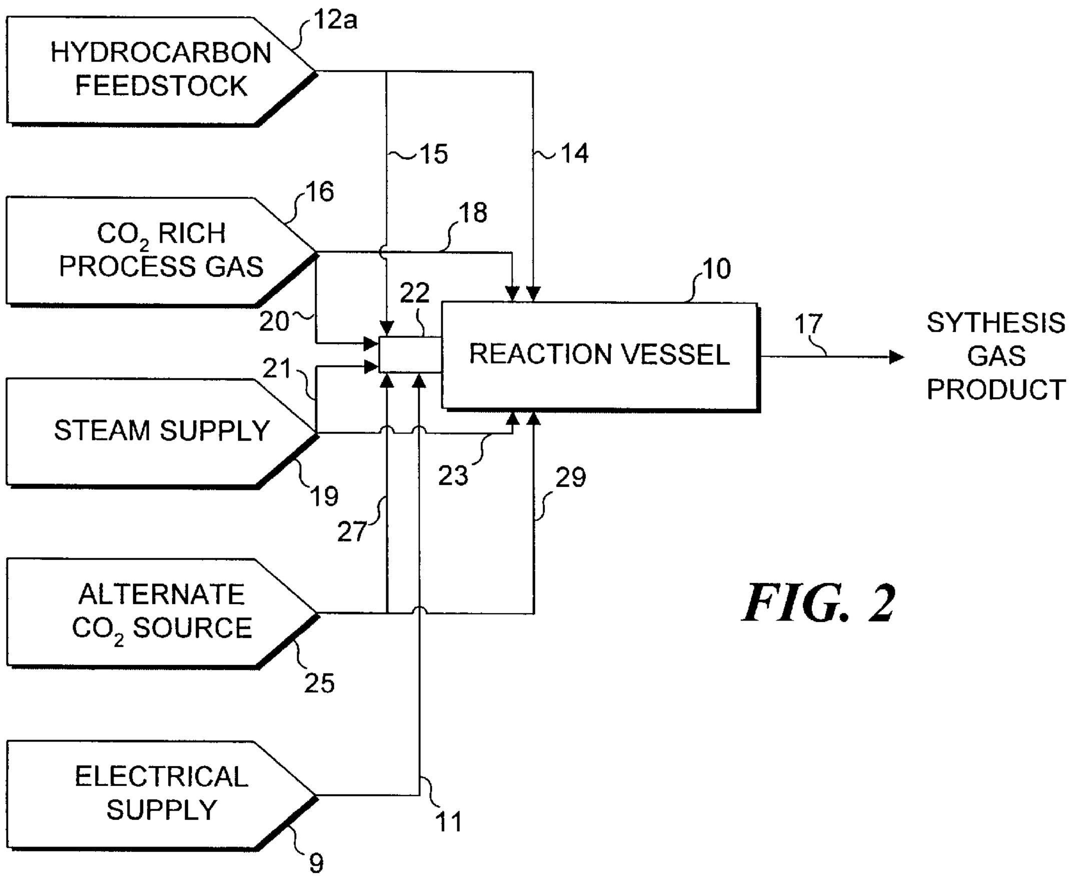
FIG. 2 is a view of a simplified process flow diagram for a CCR process that converts a hydrocarbon feedstock into a synthesis gas product.

The CCR process can be used to produce a variety of desirable products using different chemical reactions. FIG. 2 illustrates an embodiment in which the desired product is synthesis gas. As in FIG. 1, $CO_2$ rich process gas 16 is injected into ICP torch 22 via a supply line 20. ICP torch 22 ionizes $CO_2$ rich process gas 16, and the ionized $CO_2$ plasma is injected into reaction vessel 10. In this embodiment, the feedstock material is a hydrocarbon feedstock 12*a*, which is fed into reaction vessel 10 via supply line 14 to react with the ionized $CO_2$ plasma. $CO_2$ rich process gas 16 can also be injected into the reaction vessel in a non-ionized state via supply line 18, to provide sufficient $CO_2$ to ensure that all of hydrocarbon feedstock 12*a* is processed. Furthermore, hydrocarbon feedstock 12*a* can be injected into ICP torch 22 via supply line 15.

FIG. 2 shows an alternate $CO_2$ source 25 that injects $CO_2$ into either ICP torch 22 via a supply line 27 or into reaction vessel 10 via a supply line 29. It is expected that this method of producing synthesis gas would be employed at existing petrochemical production facilities. Such facilities often produce a waste stream that includes a $CO_2$ component. For example, a facility that uses synthesis gas to produce liquid fuels creates a tail gas byproduct, which includes a $CO_2$ component. Depending on the other components produced by the alternate $CO_2$ source, it may be economically favorable to use such a source. As discussed above, one of ordinary skill in the art will be able to readily determine whether the use of such an alternate $CO_2$ source provides a commercial benefit.

FIG. 2 also shows a steam supply 19 that provides steam, which can be injected into either ICP torch 22 via a supply line 21, or into reaction vessel 10 via a supply line 23. The $H_2$:CO ratio of the synthesis gas product can easily be increased by introducing steam into either ICP torch 22 or reaction vessel 10. If lower $H_2$:CO ratios are desired, additional $CO_2$ can be introduced into ICP torch 22 or reaction vessel 10. As noted earlier, a given ICP torch can process a limited volume of material, which will influence the decision of where to inject the steam. The effect of introducing steam into the reaction is best understood by examining the reaction with respect to a specific hydrocarbon, as discussed in detail below.

The reaction of $CO_2$ with a generic hydrocarbon (characterized by the general formula $C_aH_b$) is as follows:

$$(1)C_aH_b+(a)CO_2+\text{ENERGY}\rightarrow(2a)CO+(\tfrac{1}{2}b)H_2 \quad (1)$$

The resulting synthesis gas product will have low levels of $H_2O$, $CO_2$, nitrogen oxides ($NO_x$), and soot when the process is operated at or near equilibrium reaction temperatures. Preferably, organic feedstock 12 is primarily $CH_4$. Natural gas is a readily available source of $CH_4$.

The reaction of one mole of ionized $CO_2$ plasma with one mole of $CH_4$ produces two moles of CO and two moles of $H_2$:

$$(1)CO_2+(1)CH_4\rightarrow(2)CO+(2)H_2 \quad (2)$$

The preceding reaction will thus produce a synthesis gas with an $H_2$:CO ratio of 1:1. The introduction of one mole of steam ($H_2O$) increases the $H_2$:CO ratio to 5:3. An additional mole of $CH_4$ is required to complete the reaction, as shown by the following equation:

$$(1)CO_2+(1)H_2O+(2)CH_4\rightarrow(3)CO+(5)H_2 \quad (3)$$

Additional steam and $CH_4$ (in the correct proportions) can be introduced to increase the $H_2$:CO ratio even more.

Furthermore, the synthesis gas produced from this reaction will be of high quality, with minimal contaminants. In contrast, it should be noted that prior art methods of producing synthesis gas yield a product that has significant levels of $H_2O$ and $CO_2$ contamination. As mentioned previously, if a lower $H_2$:CO ratio is desired, additional $CO_2$ can be introduced into the reaction.

Based upon the maximum rated flow rate of ICP torch 22, it will be apparent that one of ordinary skill in the art can readily determine the amount of material provided by hydrocarbon feedstock 12*a*, steam supply 19, and/or alternate $CO_2$ source 25 that can be injected into ICP torch 22, along with $CO_2$ rich process gas 16, to produce a desired synthesis gas product, and for a specified amount of thermal energy input to drive the reaction. It should be noted that due to the flow rate (or throughput) limitation of ICP torch 22, only a finite mass of material can be ionized by the ICP torch. For small-scale production purposes, injecting steam, feedstock material or any other non-$CO_2$ reactants may not exceed the flow rate of the ICP torch. For large volume processes, it is preferable to inject only a $CO_2$ source into the ICP torch, and to inject the other reactants into the reaction vessel.

A potentially more useful option is the diversion of a portion of $CO_2$ rich process gas 16 through supply line 18, so that it can be injected in a non-ionized state into reaction vessel 10, along with hydrocarbon feedstock 12*a*. To clarify the benefit of this approach, assume that an ICP torch can ionize only one mole per minute of $CO_2$, but hydrocarbon feedstock 12*a* supply system, $CO_2$ rich process gas 16 supply system, and reaction vessel 10 can accommodate two moles of $CO_2$ per minute. If the hydrocarbon feedstock is $CH_4$, one mole of $CO_2$ and one mole of $CH_4$ will react to form two moles of CO and one half mole of $H_2$, given sufficient energy input. By diverting one mole of $CO_2$ through supply line 18 for injection into reaction vessel 10 with two moles of $CH_4$, a system that previously was limited to a production rate of one mole per minute, due to the limited throughput of the torch, can now process two moles of $CO_2$ per minute.

The mass of non-ionized $CO_2$ from supply line 18 that is injected into reaction vessel 10 will also be limited by the energy available. Many of the reactions for which this method is applicable are endothermic—i.e., they require energy to be input. In the present invention, the energy is provided by the highly energetic ionized plasma that is produced by ICP torch 22. Furthermore, it should be noted that the introduction of additional non-ionized $CO_2$ into reaction vessel 10 via supply line 18 should not exceed a level corresponding to the total energy available to carryout the desired reaction and raise the reaction products to the desired temperature. The energy required for these reactions is well understood by those of ordinary skill in the art, and it is a relatively simple task to determine the mass of material that can be processed, and thus the mass of non-ionized $CO_2$ 18 that can be injected into reaction vessel 10 for a given amount of energy supplied by the plasma.

Similarly, when material from either steam supply 19 or alternate $CO_2$ source 25 is added to the system, it will be necessary to determine whether it is more desirable to introduce these reactants into ICP torch 22 or into reaction vessel 10.

Figure 3:
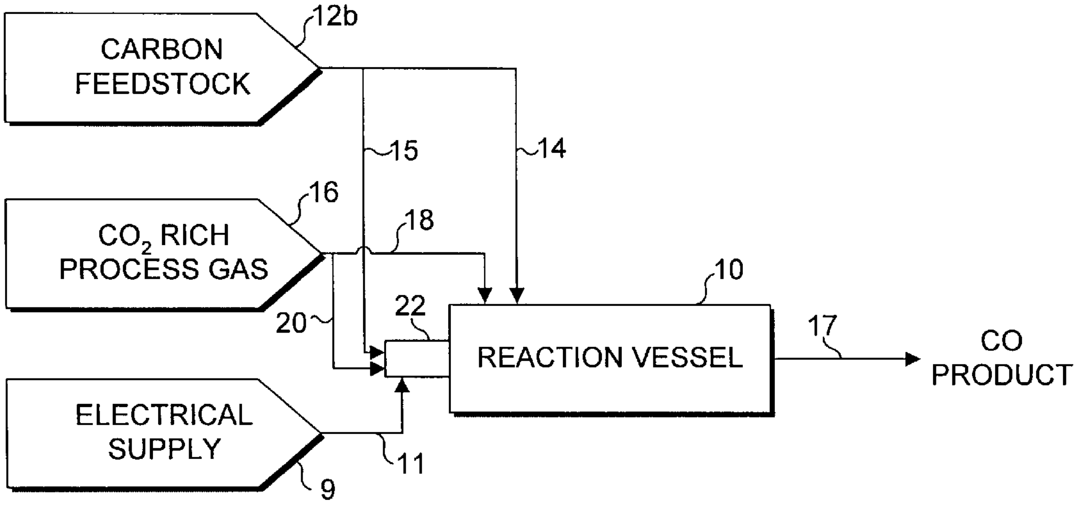
FIG. 3 is a view of a simplified process flow diagram for a CCR process that converts a carbon feedstock into a CO gas product.

FIG. 3 illustrates another preferred embodiment in which solid carbon (C) is substituted for organic feedstock 12 (shown in FIG. 1). This solid carbon can be rejected material from the carbon black industry or waste material such as spent, granulated carbon.

As in the previous Figures, $CO_2$ rich process gas 16 is injected into ICP torch 22 via supply line 20. ICP torch 22 ionizes $CO_2$ rich process gas 16, and the ionized $CO_2$ plasma is injected into a reaction vessel 10. The organic feedstock material is a carbon feedstock 12*b*, which is fed into reaction vessel 10 via supply line 14 to react with the ionized $CO_2$ plasma. Additional $CO_2$ rich process gas 16 can also be injected into the reaction vessel in an non-ionized state via supply line 18, to provide sufficient $CO_2$ to ensure that all of carbon feedstock 12*b* is processed. Furthermore, carbon feedstock 12*b* can be injected into ICP torch 22 via supply line 15. As discussed above, those of ordinary skill in the art can readily determine the appropriate feed rates into ICP torch 22 and reaction vessel 10 for an optimum production efficiency.

In this reaction, one mole of ionized $CO_2$ plasma will react with one mole of C to produce two moles of CO:

$$(1)CO_2+(1)C\rightarrow(2)CO \tag{4}$$

The preceding reaction can only be carried out using a non-combustion-based energy input, such as a $CO_2$ plasma, because the presence of oxygen in a combustion environment will favor the production of $CO_2$ rather than CO.

Figure 4:
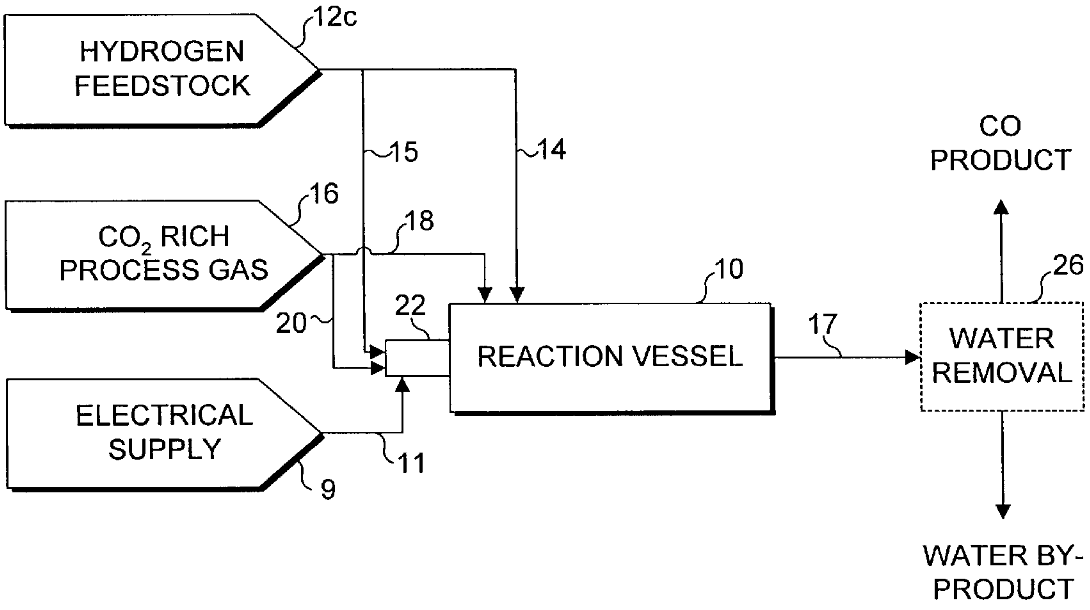
FIG. 4 is a view of a simplified process flow diagram for a CCR process that converts a hydrogen feedstock into a CO gas product.

Often, CO is a more desirable product than $H_2$. FIG. 4 illustrates an embodiment that is useful when an excess of $H_2$ is available. As in the Figures discussed above, $CO_2$ rich process gas 16 is injected into ICP torch 22 via supply line 20. ICP torch 22 ionizes $CO_2$ rich process gas 16, and the ionized $CO_2$ plasma is injected into a reaction vessel 10.

In this embodiment, the feed material is $H_2$ feedstock 12*c*, which is fed into reaction vessel 10 via supply line 14, to react with the ionized $CO_2$ plasma. $CO_2$ rich process gas 16 can also be injected into the reaction vessel in a non-ionized state via supply line 18, to provide sufficient $CO_2$ to ensure that all of hydrogen feedstock 12*d* is processed. Furthermore, hydrogen feedstock 12*c* can be injected into ICP torch 22 via supply line 15. As discussed above, those of ordinary skill in the art can readily determine the best combination of feed rates into ICP torch 22 and reaction vessel 10 for an optimum production efficiency.

The following reaction is employed in this embodiment:

$$(1)CO_2+(1)H_2\rightarrow(1)CO+(1)H_2O \tag{5}$$

In this reaction, one mole of $CO_2$ reacts with one mole of $H_2$ to produce one mole of CO and one mole of $H_2O$. The reaction is noteworthy, because relatively little energy is required to drive it. The heat of reaction (a measure of the energy required to complete a reaction once the reactants are at a suitable reaction temperature) is 9.84 kilocalories for the above reaction. This value is significantly lower than the heat of reaction for the other reactions (Equations 2–4) discussed above. Because water is a product of the reaction, and CO is the desirable portion, a water removal system 26 is preferably provided downstream of product output line 17.

Figure 5:
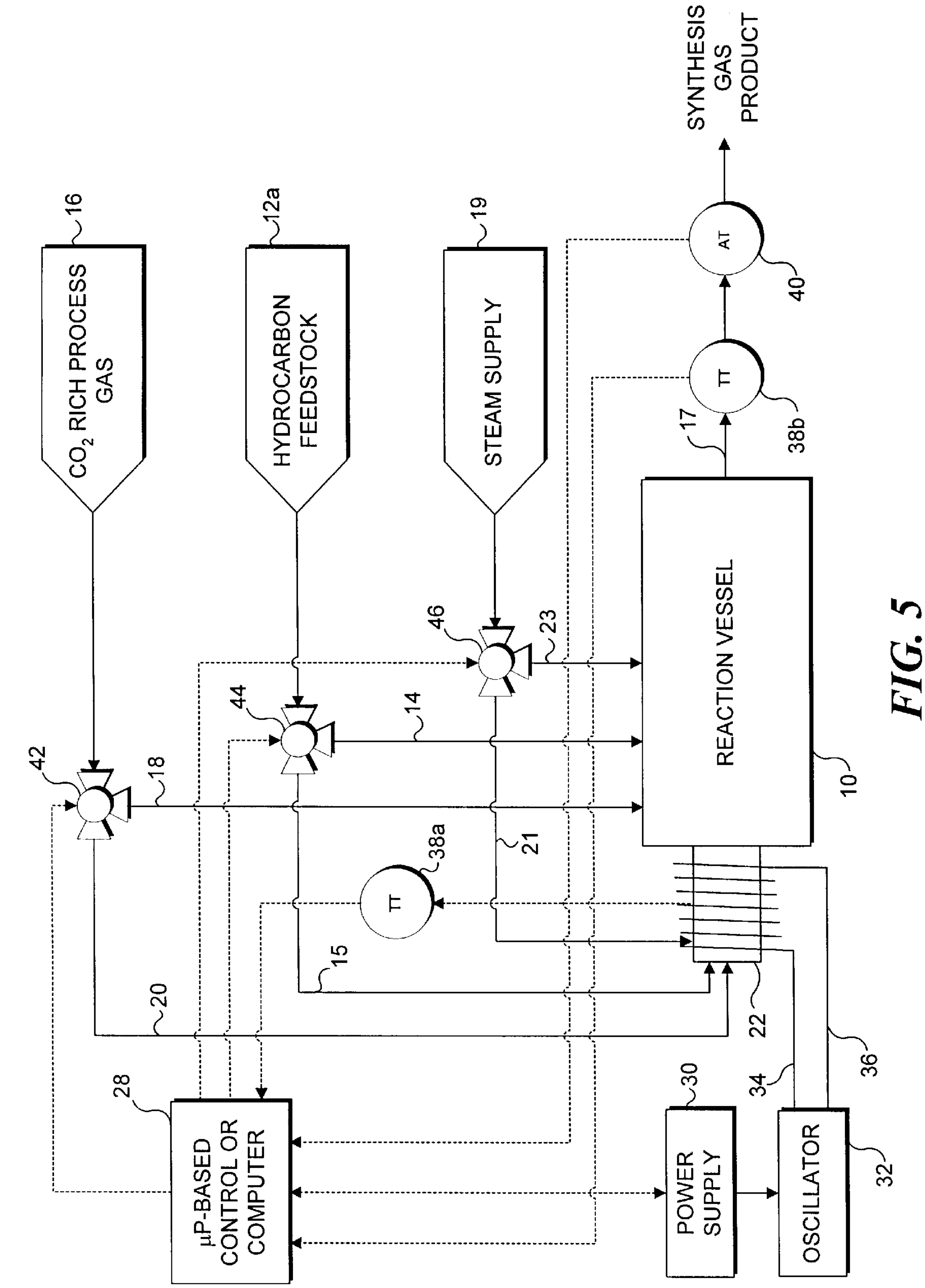
FIG. 5 is a process flow diagram illustrating the more important control parameters that can be selectively varied to optimize both ICP torch efficiency, as well as reaction vessel product yield, and showing a control device connected to a variable power supply, an oscillator, a variable $CO_2$ gas supply system, and a variable organic supply system.

FIG. 5 illustrates an embodiment of the present invention, incorporating a programmable control device, in which $CO_2$ is used as a process gas in connection with an ICP torch to produce synthesis gas. This system has a variable power supply 30 that includes an oscillator 32, which is used to energize ICP torch 22. Oscillator 32 is connected to ICP torch 22 by an input line 34 and an output line 36 and provides an alternating electrical current to the torch to produce the magnetic field that ionizes the plasma gas. A variable flow rate supply system for $CO_2$ rich process gas 16 is connected to ICP torch 22 by supply line 20 and to reaction vessel 10 by supply line 18. A mixing valve 42 enables the flow of $CO_2$ rich process gas through supply lines 18 and 20 to be controlled. As noted above, one of ordinary skill in the art can readily determine optimal feed rates of $CO_2$ rich process gas 16 through supply lines 18 and 20.

A mixing valve 44 controls hydrocarbon feedstock 12*a*. Mixing valve 44 selectively feeds hydrocarbon feedstock 12*a* into reaction vessel 10 via supply line 14 or into ICP torch 22 via supply line 15. The optimal feed rates of hydrocarbon feedstock 12*a* through supply lines 14 and 15 are readily determined by one of ordinary skill in the art.

A mixing valve 46 controls steam supply 19 by selectively feeding steam supply 19 into ICP torch 22 via supply line 21, or into reaction vessel 10 via supply line 23. The optimal feed rates through supply lines 21 and 23 of steam supply 19 that is required to produce synthesis gas of the desired $H_2$:$CO_2$ ratio are readily determined.

The ionized $CO_2$ plasma gas from ICP torch 22 enters reaction vessel 10, where it mixes with hydrocarbon feedstock 12*a* (and steam if required for a desired $H_2$:$CO_2$ ratio). If required, the resulting product gases can then be processed by optional acid gas removal unit 24 (shown in FIG. 1).

Note that variable power supply 30, $CO_2$ rich process gas mixing valve 42, hydrocarbon feedstock mixing valve 44, and steam supply mixing valve 46 are all coupled to a control device 28. In one preferred embodiment, control device 28 is a personal computer control system or alternatively, a programmed process controller. The personal computer or other programmed process controller is preferably coupled to receive a signal indicative of the parameters monitored by two or more sensing devices and preferably applies a process logic loop in conjunction with software that determines either or both of the maximum efficiency of ICP torch 22 and reaction vessel 10 and then maintains the production of the product at maximum efficiency. FIG. 5 shows a temperature transducer 38*a* associated with ICP torch 22, a temperature transducer 38*b* associated with the synthesis gas product exiting reaction vessel 10 via product exit line 17, and an analysis transducer (preferably adapted to measure $H_2$ and CO) also associated with the synthesis gas product exiting reaction vessel 10 via product exit line 17. These transducers are coupled to control system 28.

The personal computer or process controller based control system 28 preferably executes two different optimization models. The first model is used for optimizing the operation of ICP torch 22, by determining the optimum $CO_2$ rich process gas 16 flow rate through supply line 20 to ICP torch 22 and the optimal power level supplied by power supply 30 to energize the ICP torch. Control system 28 energizes ICP torch 22 using the optimal settings determined with this model for the ICP torch (described in detail in the following section), and then analyzes data from temperature transducer 38*a,* which is mounted on a heat sink (not shown) surrounding ICP torch 22. The temperature data, along with the established coolant flow rates in the heat sink, enable the efficiency of ICP torch 22 to be monitored. It should be noted that the model is preferably executed during the design of ICP torch 22, but can be run at any other time prior to or during actual operation of the ICP torch to take into consideration changes in the nominally fixed process parameters. Control system 28 can automatically adjust $CO_2$ rich process gas 16 flow rate through supply line 20 to ICP torch 22 using mixing valve 42, and the power supplied by power supply 30 to ICP torch 22, to operate the torch in accord with the setting determined by the model, to achieve a substantially maximum efficiency. These settings can then be fine tuned empirically to further optimize the operating efficiency of the ICP.

The second optimization model relates to the product yield from the reaction vessel. Details of the reaction effected in reaction vessel 10 can be employed using chemical equilibrium and mass and energy balance analyses to determine the required proportion and flow rates of the plasma gas and feedstock, in regard to maximizing or achieving a required yield of the desired product output from the reaction vessel. The values determined from such a calculation can be fine tuned by employing data from analysis transducers 38*b* and 40 (mounted at product outlet line 17 of reaction vessel 10), which monitor the product temperature and yield from the reaction vessel.

Using the data from analysis transducers 38*b* and 40, control system 28 can automatically adjust any or all of the following parameters to maintain optimal production efficiency for the overall system: (1) the power level applied to energize ICP torch 22 by variable power supply 30; (2) the flow rate of gas provided by variable supply system for $CO_2$ rich process gas 16 to ICP torch 22 via supply line 20 using mixing valve 42; (3) the flow rate of gas provided by variable supply system for $CO_2$ rich process gas 16 to reaction vessel 10 via supply line 18 using mixing valve 42; (4) the flow rate of hydrocarbon feedstock 12*a* supplied to ICP torch 22 via supply line 15 using mixing valve 44; (5) the flow rate of hydrocarbon feedstock 12*a* supplied to reactor vessel 10 via supply line 14 using mixing valve 44; (6) the flow rate of steam supply 19 supplied to ICP torch 22 via supply line 21 using mixing valve 46; and (7) the flow rate of steam supply 19 supplied to reactor vessel 10 via supply line 23 using mixing valve 46.

It should be noted that analysis transducer 40 is selected to detect the products of the desired reaction. FIG. 5 relates to a system configured to produce synthesis gas, and for use in this embodiment, analysis transducer 40 must detect the components of synthesis gas—CO and $H_2$. Reaction vessel 10 and $CO_2$ rich process gas 16 can be used to form different products using different organic feedstocks. Preferably, when a different organic feedstock 12 is used, analysis transducer 40 is chosen to detect the desired product. Monitoring the product yield from reaction vessel 10 with analysis transducer 40 may indicate that the highest product yield can be obtained for certain processes, by operating ICP torch 22 at a non-optimal efficiency. Therefore, control system 28 is preferably programmed to prioritize product yield over torch efficiency. Those skilled in the art will understand that certain constraints can be included in this program. For example, operating ICP torch 22 at less than optimal efficiencies will likely result in increased costs. However, if these increased costs are offset by the value of the increased product yield attained thereby, operating ICP torch 22 in a non-optimal fashion makes economic sense. When these increased costs are not offset by the value of the increased product yield, control system 28 is preferably programmed to operate ICP torch 22 in an optimal fashion, at the expense of reduced product yield. Alternatively, control system 28 can be programmed to enable the operator to select either production efficiency or torch efficiency as having priority during the operation of ICP torch 22 and reaction vessel 10.

While not required to determine product yield, it is helpful to employ temperature transducer 38*b* to measure the temperature of the synthesis gas product exiting reaction vessel 10 via product exit line 17. The product temperature affects thermodynamic equilibrium and kinetic considerations. If the product temperature is too low, equilibrium will start to favor the formation of soot and $CO_2$. Furthermore, the reaction rate may be too sluggish to achieve the desired conversion in the residence time allowed in reaction vessel 10. Finally, empirical data obtained from operating the system in FIG. 5 may show that once the synthesis gas product exiting reaction vessel 10 via product outlet line 17 has reached a specific temperature, any further increase in temperature caused by increasing the power applied to energize the torch from power supply 30 does not lead to an increase in the product yield. Such empirical data will be useful in operating the system in the most efficient and cost effective manner.

Figure 6:
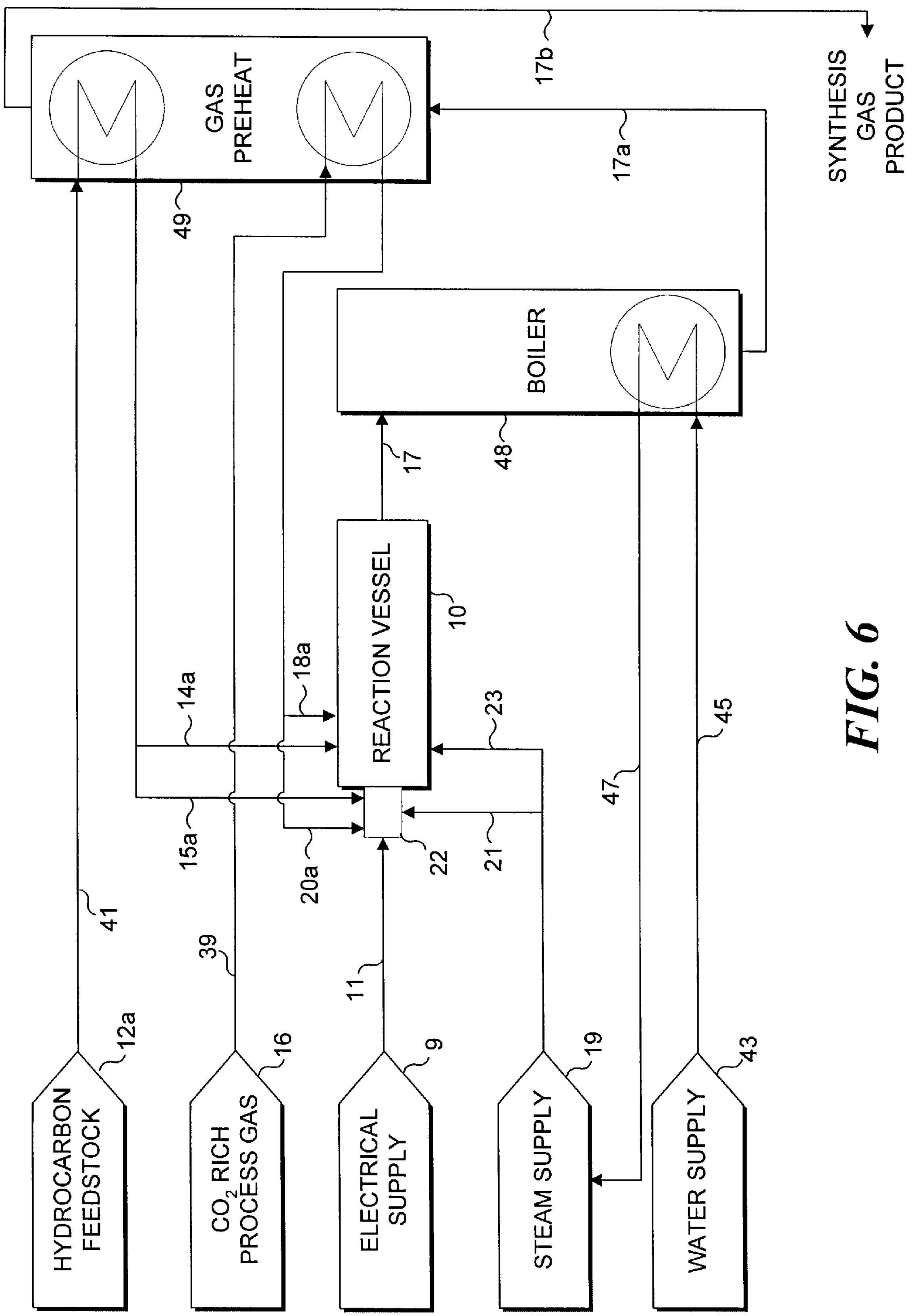
FIG. 6 is a view of a simplified process flow diagram for a CCR process that converts a hydrocarbon feedstock into a synthesis gas product, illustrating how heat is recovered from the hot synthesis gas product to further enhance the overall system efficiency.

FIG. 6 illustrates several enhancements to the systems described in the previous Figures. The purpose of these enhancements are to maximize the efficiency of the overall process. Hot product gas leaving reaction vessel 10 via product outlet line 17 is routed through a boiler 48 where its heat is used for turning water (supplied via a supply line 45 from a water supply 43) into steam. The steam exits boiler 48 via a supply line 47 and is available as steam supply 19. As indicated previously, steam from steam supply 19 can be injected into ICP torch 22 via supply line 21 or into reaction vessel 10 via supply line 23.

After exiting boiler 48, the hot product gas flows through product exit line 17*a* to a gas preheat unit 49, which uses the hot product gas to preheat both $CO_2$ rich process gas 16 and hydrocarbon feedstock 12*a*. Hydrocarbon gas from hydrocarbon feedstock 12*a* enters gas preheat unit 49 via a supply line 41. Heated hydrocarbon gas can then be injected into ICP torch 22 via supply line 15*a* and into reaction vessel 10 via supply line 14*a*.

By preheating the reactants (the $CO_2$ rich gas and the hydrocarbon gas), less energy must be supplied to the ICP torch 22 from electrical supply 9 (via supply line 11) to drive the desired reaction, thus lowering the unit's operating costs. Gas preheat unit 49 is shown being used to preheat a hydrocarbon feedstock. Preheating can also be used in conjunction with organic, carbon, hydrogen or other feedstock materials. Similarly, alternate $CO_2$ source 25, as shown in FIG. 2, may also be preheated in this manner. Furthermore, most downstream processes require the synthesis gas to be at a lower temperature than that of the synthesis gas product exiting reaction vessel 10.

As illustrated in FIGS. 1–6, the feedstock material (organic feedstock 12, hydrocarbon feedstock 12*a*, carbon feedstock 12*b*, or hydrogen feedstock 12*c*), $CO_2$ rich process gas 16, and steam supply 19 are shown being routed and injected into ICP torch 22 and reaction vessel 10 via a variety of individual supply lines, entering ICP torch 22 and reaction vessel 10 at different locations. While not shown in the drawings, it is contemplated that these supply lines can be merged prior to connection with ICP torch 22 and reaction vessel 10 so that instead of requiring a multiplicity of injection ports into ICP torch 22 and reaction vessel 10, for example, a single injection port into ICP torch 22 and a single injection port into reaction vessel 10 can be used. Fewer injection ports will result in lower fabrication and maintenance costs for the system. However, as described in detail below (particularly with respect to FIG. 9), a multiplicity of injection ports into reaction vessel 10 may be preferable to enhance mixing of the reactants with the plasma gas in reaction vessel 10.

Figure 7:
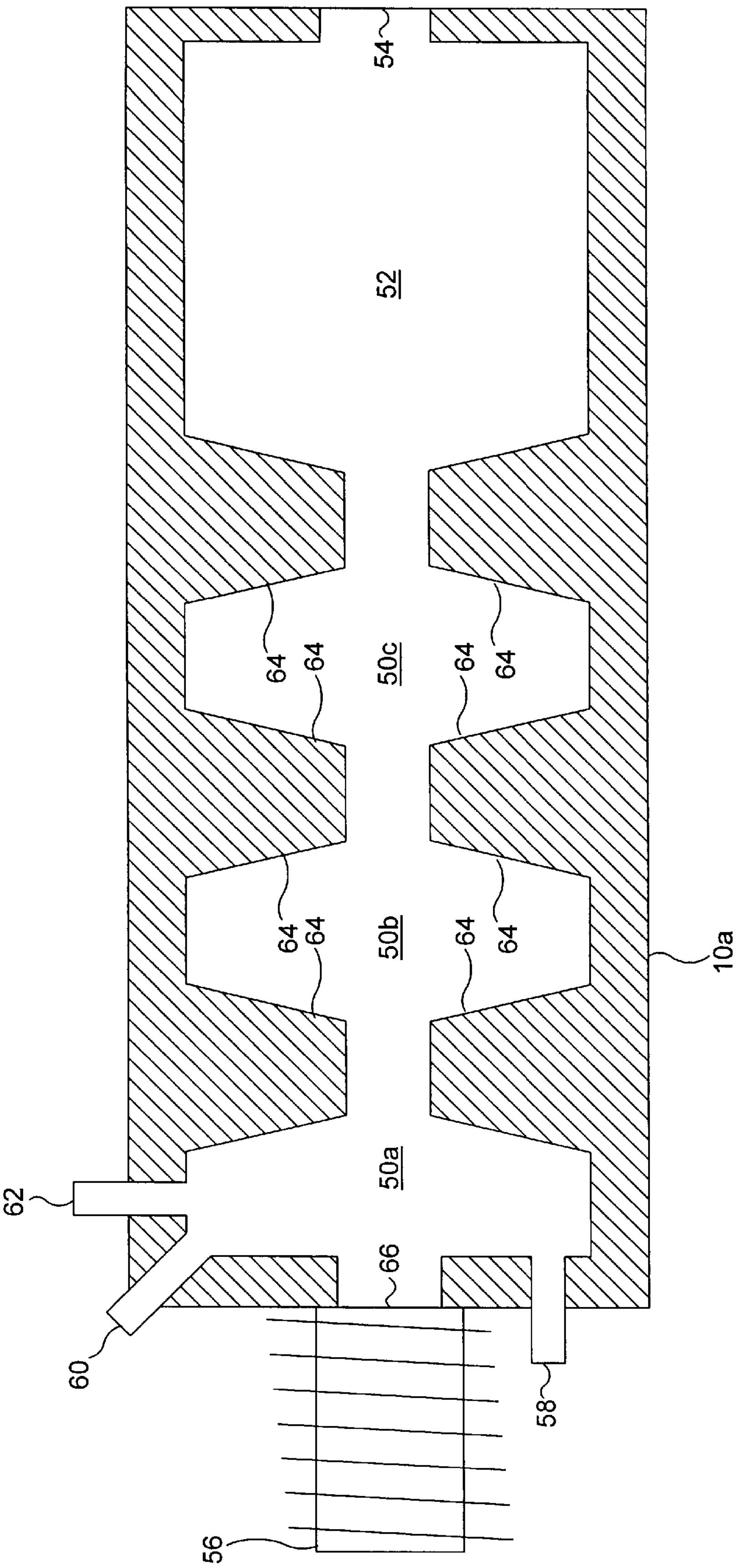
FIG. 7 is a schematic longitudinal cross-sectional view of a reaction vessel.

FIG. 7 illustrates an embodiment that includes a CCR reaction vessel 10*a* designed to process relatively small volumes of feedstock material. Reaction vessel 10*a* has an inlet 66 and an outlet 54. Ionized plasma gas flows from an ICP torch 56 into inlet 66. Preferably, reaction vessel 10*a* is lined with refractory material (not separately shown) to enable it to withstand the high operating temperatures produced by the plasma. A series of baffles 64 separate reaction vessel 10*a* into three distinct mixing zones, including a chamber 50*a*, a chamber 50*b*, and a chamber 50*c*. These baffles can be formed integrally in reaction vessel 10*a*, or can be constructed of refractory material fitted inside the vessel. The function of these baffles is to provide relatively smaller orifices in the reaction vessel to create areas of high turbulence (hence, areas of thorough mixing) of the plasma, the feedstock and any other reactant, such as additional amounts of the gas used for the plasma, or steam. Other baffle configurations or structures that create high turbulence can alternatively be used.

Organic supply and non-ionized $CO_2$ gas can be injected through one or more ports 58, 60, and 62. As the reacting gas mixture passes a last baffle 64, it enters a chamber 52. The length of chamber 52 is selected to provide sufficient residence time in reaction vessel 10*a* to insure complete reaction of the ionized plasma, any additional injected $CO_2$, any steam introduced to manipulate the $H_2$:CO ratio, and the feedstock material (organic, hydrocarbon, carbon, or hydrogen). As noted above, the product gas can optionally be treated using a downstream acid gas removal system, if necessary to remove acid byproducts of any impurities that may be present in the feedstock. Similarly, as shown in FIG. 4, the product gas can be treated using a downstream water removal system, as is required when the feedstock is hydrogen and the desired product is CO.

Figure 8:
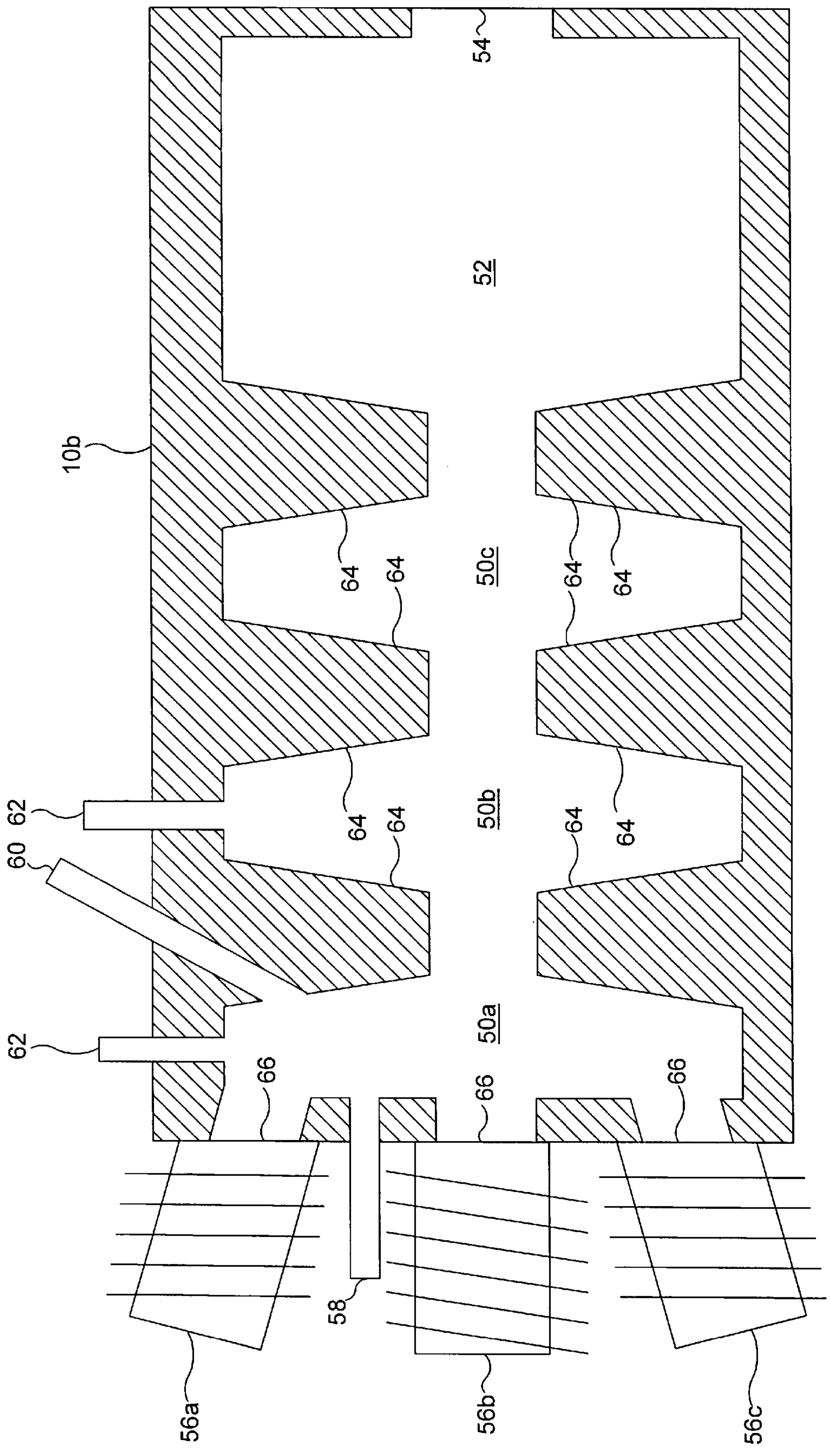
FIG. 8 is a schematic longitudinal cross-sectional view of a reaction vessel that includes three ICP torches.

FIG. 8 illustrates a CCR reaction vessel 10*b* having three ICP torches 56*a*, 56*b*, and 56*c* designed to greatly increase the energy available to drive an endothermic reaction, thereby increasing the volume of feedstock material that can be processed, relative to the embodiment shown in FIG. 7. As discussed above, reaction vessel 10*b* is preferably lined with a refractory material and includes baffles 64 (or alternative baffle configurations) that promote turbulent flow and thorough mixing of the plasma gas and feedstock. In the embodiment of FIG. 8, ICP torches 56*a*, 56*b*, and 56*c* each produce a plasma that is injected into the reaction vessel through spaced-apart inlet ports 66. The feedstock injection ports, the three mixing chambers, the baffles, the residence time chamber, and the outlet described above in connection with the embodiment of FIG. 7 are all present in this embodiment as well. As noted above, the product gas can be treated with a downstream acid gas removal system or water removal system, as required, producing a product gas that is substantially free of any acid gases or water.

Associated with a given ICP torch is a maximum rated throughput of plasma gas. It is easier to construct feedstock supply systems and reaction vessels to accommodate higher throughput levels than to change the design of an ICP torch for this purpose. For example, in the embodiment of FIG. 8, three ICP torches are provided to increase the throughput of the apparatus. It is possible to operate the system with one, two, or all three ICP torches energized and producing the plasma—as necessary to handle different mass flow rates of feedstock material. As previously discussed, non-ionized $CO_2$ gas can be injected into the reaction vessel along with the feedstock, through the same or different injection ports.

Alternative embodiments involving either more torches or a different configuration of the torches relative to the housing of the reaction vessel are envisioned. One such embodiment (not shown) would include a plurality of torches mounted around the longitudinal axis of the reaction vessel, with a primary feedstock injection port disposed at an inlet end of the reaction vessel in such a manner that the feedstock flows into the reaction vessel in a direction that is generally parallel to the longitudinal axis of reaction vessel. Plasma gas from the plurality of ICP torches would enter the reaction vessel at substantially a right angle to the feedstock flow, creating a plurality of zones of high turbulence and that promote thorough mixing of the plasma gas and other reactants.

Figure 9:
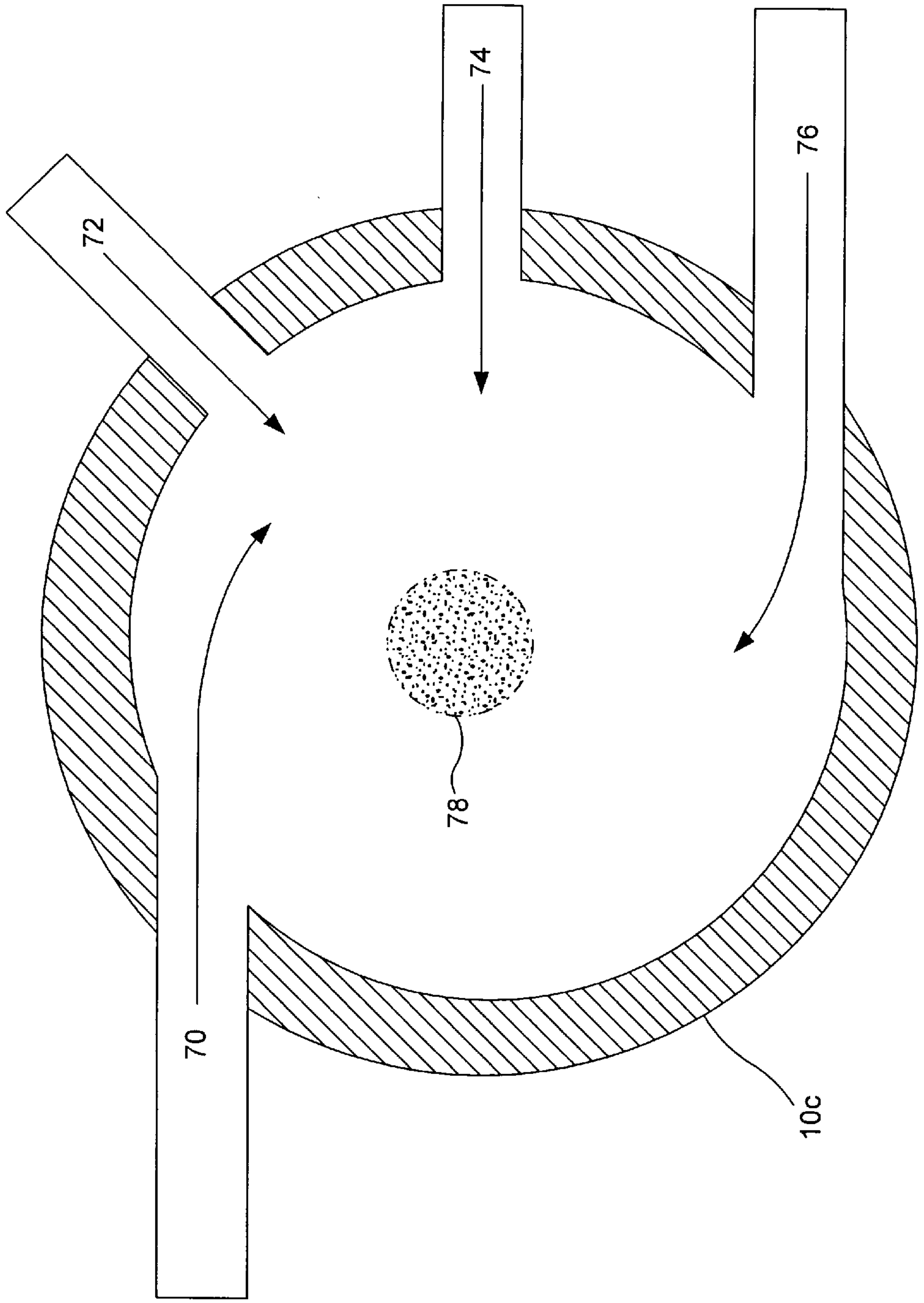
FIG. 9 is a radial cross-sectional view of a reaction vessel showing different injection port configurations.

FIG. 9 illustrates exemplary injection patterns for the feedstock material and non-ionized $CO_2$ gas in a reaction vessel 10*c*. A plasma zone 78 is disposed at the center of reaction vessel 10*c*. Feedstocks, non-ionized $CO_2$ gas or steam are radially injected into plasma zone 78, via a port 72, or via a port 74. Additionally or alternatively, the reactants can be injected tangentially at a port 70 and/or a port 76. Note that simultaneous tangential injections at port 70 and port 76 will help to produce non-laminar flow of the reactants and insure their vigorous mixing inside reaction vessel 10*c*. In some applications, it might also be beneficial to consider simultaneous but opposed tangential injection of reactants to further increase turbulence in the injection chamber. In this approach, one reactant is injected tangentially to promote a clockwise swirl flow while the other reactant is injected tangentially counterclockwise to produce an opposing swirl to achieve high relative velocities and turbulence. It should be noted that tangential injection patterns provide an additional benefit of cooling the refractory lining of reaction vessel 10*c*, thus increasing the lifetime of the refractory lining and lowering maintenance costs. The cooling is only a benefit to the extent that there would be concern of direct plasma impingement on refractory without the gas flow along the wall. For liquid injection, it is normally a practice to avoid direct liquid impingement on refractory walls to avoid spalling of the refractory material.

Overview of ICP Torch Efficiency Control

For the reasons noted above, it is important to maximize the efficiency with which an ICP torch operates. In a typical application for an ICP torch, a high frequency electrical current is applied to an induction coil of the torch to ionize a specific gaseous fluid, which is referred to as the "plasma gas." The plasma that is thus generated will be used for processing a specific feedstock. The feedstock will generally be an organic stream having a low value that can be processed into a higher value material. The feedstock can be a gas, such as methane, or a liquid, such as waste oil, or a solid such as carbon black, or a mixture of a gas, a liquid, and/or a solid. In one preferred embodiment, the feedstock is not an organic material, but instead is hydrogen, an inorganic gas.

It has been determined that the efficiency of an ICP torch depends primarily upon maintaining an optimal plasma gas flow rate and applying an optimal power level to the induction coil of the torch to generate the plasma. While other factors such as the length of the torch and the radius of the torch also affect efficiency, for a given size ICP torch and for a specific type of plasma fluid, the principal parameters of interest are the plasma gas flow rate and the power level of the torch. Experience to date shows that ICP torch efficiency at a given power level can change as much as 30 to 40% by selectively varying the plasma gas flow rate through the torch.

An ICP torch is driven by a high frequency magnetic field that is generated by passing a high frequency alternating current through an induction coil to create an ionized plasma gas. For a given ICP torch, a preferred embodiment of the present invention contemplates that both the magnitude of the electrical current and the plasma gas flow rate will be variable over a desired range. In this embodiment, an operator can alternatively selectively vary both the magnitude of the electrical current applied to the induction coil and the plasma gas flow rate, or hold one of these parameters constant and vary the other.

The present invention provides a model for an ICP torch that can be used to maximize the torch efficiency by determining optimal parameters for the plasma gas flow rate and the power level of the torch, and a method for controlling the ICP torch to achieve optimal efficiency with the parameters that were determined by the model. The method preferably employs a selectively variable power supply to control the electrical current applied to ionize the plasma gas, and a selectively variable plasma gas supply for controlling the flow rate of plasma gas through the torch. In this embodiment, one or more sensors will collect data indicative of torch efficiency and/or product production rate, providing the operator with a real time display of one or both of these indicators.

In one preferred embodiment of the method, the model is used to determine the optimal settings for the power level and the plasma gas flow rate. The operator can then vary the magnitude of electrical current from the power supply that is applied to the ICP torch induction coil, to determine a power level that produces a maximum efficiency based on the sensor(s). The process is then repeated to adjust the plasma gas flow rate to achieve a further improvement in the maximum efficiency, again based on the feedback signal produced by the sensor(s). Since there can be some interaction in the applied power level and the plasma gas flow rate, it may be necessary to repeat the process again, this time varying the magnitude of the applied power to the induction coil to determine if any further improvement in efficiency can be achieved. The empirically determined settings of each of these parameters will likely be recorded, since they are useful for future production.

If a different type of plasma gas is selected, this process should be repeated, as the efficiency of an ICP torch is also a function of plasma gas type, as well as a function of power level and plasma gas flow rate.

ICP Torch Model

As noted above, a mathematical model relating various parameters to the efficiency of an ICP torch is preferably used to determine at least initial values for these parameters, for a given ICP torch size and geometry and a specific type of plasma gas. Once these "fixed" criteria are specified, the optimum values for the user adjustable parameters can be determined with the model. Such a model can be implemented using software executed on a computer to quickly and easily determine the optimal power level and plasma gas flow rate that should produce substantially a maximum efficiency during the operation of the ICP torch. Such a model can be used to evaluate the design of an ICP torch by selectively varying any of the parameters that affect torch efficiency, including the gas flow rate, the frequency of the power generator, the power level, the type of plasma gas, the length of the torch, and the radius of the torch.

The global power balance in an ICP torch may be described by the following:

$$Po=Pr+Pc+Pg \qquad (6)$$

where Po is the ohmic power delivered by the RF field to the plasma gas as the gas passes through the center of the induction coil, Pr is the radiated power loss, Pc is the power lost by thermal conduction, and Pg is the exit plasma gas power. The plasma torch ohmic or electrical to thermal power efficiency is the quantity Pg/Po. Po is a known quantity as it corresponds to the magnitude of the electrical current provided by the power supply to the induction coil.

A very close approximation of Pr+Pc can be determined with a sensor that is used to measure the temperature change of a heat sink around the body of the torch and related structure. This heat sink is a standard element of an ICP torch and ensures that the internal lining of the ICP torch does not exceed a safe maximum temperature. Because the heat sink is of a known mass and composition, it is a straightforward calculation for one of ordinary skill in the art to determine the amount of energy (Pr+Pc) that causes a measured temperature change. A change in the level of heat generated by the ICP torch will result in a change in the temperature in the heat sink very quickly. Equilibrium will be established in less than a minute.

The power supply setting corresponding to Po and a value equal to Pr+Pc is preferably input to a personal computer or other processor, which will calculate the expected efficiency (Pg/Po). Alternatively, during operation of the ICP torch, a measured value for (Pr+Pc) and a value Po can be input to the computer or other processor to determine the actual measured efficiency of the ICP torch from the relationship Po=Pr+Pc+Pg. This efficiency will then be displayed to the torch operator on a real time basis. As the plasma gas flow rate or the power level is varied, the display will alert the operator of the change in the efficiency of the torch.

As mentioned earlier, measuring the temperature change of the heat sink will provide a close approximation of Pr+Pc. A small amount of energy will be lost due to eddy currents in metallic parts that are close to the torch coil, and by heat loss that is not reflected in the temperature change of the heat sink. These losses would be very difficult to measure, but are generally small when compared to the power loss through the heat sink and do not substantially affect the efficiency.

The model developed for the ICP torch is a one-dimensional (radial) numerical analysis that evaluates temperature profiles in an ICP torch operating at about atmospheric (or slightly elevated) pressure. The software program that models the ICP torch assumes laminar plasma gas flow, negligible viscous dissipation, local thermodynamic equilibrium, and an optically thin plasma—all reasonable assumptions for typical ICP torch configurations and operating conditions.

The modeling program solves the following one-dimensional radial heat equation:

$$(1/r)(d/dr)(r\lambda dT/dr)=Q-\sigma E^2 \tag{7}$$

where λ (W/cm/° K) is the plasma thermal conductivity, T (° K) is the plasma temperature (electron, ion, and gas temperatures are assumed equal), Q (W/cm$^3$) is the optical radiation power density, σ (ohm/cm) is the plasma electrical conductivity, and E (V/cm) is the RF electric field. The transport coefficients λ, Q, and σ are functions of T, and all quantities vary with the radius, r, of the ICP torch. The electric field E is obtained from Maxwell's equations, which in one dimension reduce to:

$$(d/dr)(1/r)(d/dr)(rE)=j\omega\sigma\mu_o E \tag{8}$$

where $$j=\sqrt{-1},$$

ω (rad/s) is the angular RF frequency (ω=2πf, where f is the RF frequency of the oscillator in the power supply), and $\mu_o$ is the permeability of free space. Equations (7) and (8) constitute a system of three, second order, nonlinear, coupled ordinary differential equations applicable in solving for T(r).

For a torch of length L, the power related terms of Po=Pr+Pc+Pg can be determined from the following relationships:

$$Po=L\int\sigma E^2 2\pi dr \tag{9}$$

$$Pr=L\int Q2\pi rdr \tag{10}$$

$$Pc=2\pi L(-\lambda dT/dr) \tag{11}$$

$$Pg=\int\int\rho vC(dT/dz)2\pi r\,dr\,dz \tag{12}$$

where ρ (g/cm$^3$) is the mass density, v is the axial plasma gas velocity, and C (J/g/° K) is the gas heat capacity. For T(z) equal to a constant and assuming a gas enthalpy defined by dH=CdT, the following equation applies:

$$Pg=\int\rho vH2\pi rdr \tag{13}$$

The transport coefficients (λ, Q, and σ) for a $CO_2$ plasma in the range 1,000° K–14,000° K can be developed from first principles based on Saha's Equation (M. N. Saha, "Ionization in the Solar Chromosphere," Phil. Mag., Vol. 40, p. 472 (1920)) and assumptions for the plasma, including thermal equilibrium and electrical neutrality. Measured data for the coefficients are utilized if available.

This computational model provides a method to predict the torch operating characteristics as a finction of torch geometry and torch operating conditions. Thus, the model is usable as a tool to optimize ICP torch design and achieve maximum efficiency during operation, for CCR process applications. It should be noted that this model is solved by making assumptions about initial boundary conditions and solving the equation reiteratively. The information provided herein is sufficient for one of ordinary skill in the art of plasma dynamics to make use of this model.

Summary of the Benefits Provided by the Invention

Plasma sources, and specifically ICP torches, are well suited to provide two necessary inputs to reliably conduct industrially important gas phase chemical reactions. These inputs are: (1) a high temperature process heat, and (2) a reactant employed in the chemical reaction. The input rates of heat and of reactants to the reactor can be controlled independently of each other. An important feature of the present invention is that the heat is provided by a plasma, not a combustion reaction, so that none of the reactants is consumed in a combustion reaction to generate the required heat to drive an exothermic chemical reaction. Consequently, for the same volume of reactants, the yield is increased in the present invention. Simultaneously, heat and reactant(s) can be delivered into the reaction zone without the negative side effect of unwanted byproducts in the product gas, such as combustion byproducts.

The use of a $CO_2$ plasma generated with an ICP torch to produce synthesis gas from a hydrocarbon feedstock offers many advantages over conventional syngas production methods. As mentioned above, no combustion byproducts are generated, and no reactants are consumed to generate the required heat, so product yields are higher. Additionally, no catalysts are required, therefore desulfurization of the feedstocks is not required (sulfur "poisons" the catalysts used in conventional synthesis gas production). The process in accord with the present invention operates at atmospheric pressure, so expensive compression systems are unnecessary. Unlike the partial oxidation method for producing synthesis gas, the $CO_2$ plasma method to produce synthesis gas does not require an oxygen plant with its associated capital investment and operating costs. A wide variety of hydrocarbon feedstocks can be used in the present invention, including pumpable organic liquid wastes and chlorinated hydrocarbons. The introduction of controlled amounts of steam enables the $CO_2$ plasma method to produce synthesis gas in a very wide range of $H_2$:CO ratios.

ICP torches exhibit significant benefits compared to DC arc torches. ICP torches do not use consumable electrodes, have no moving parts, can operate continuously, and are easily controlled. More importantly, the ICP torch can use the plasma gas as a chemical reactant in the desired chemical reaction. Thus, by using an ICP torch in accord with the present invention, the plasma gas serves as both the source of thermal energy for the endothermic conversion process as well as a reactant. Furthermore, because the chemical reaction that produces the desired product takes place in a bulk feed reaction vessel as opposed to taking place within the torch, the system is capable of high throughput rates, which are not possible with systems in which the desired reaction occur within the plasma torch. The electrical-to-thermal efficiency of a properly designed and operated thermal conversion system, including a power supply, an ICP torch and a reaction vessel, can approach 75%.

Although the present invention has been described in connection with several preferred forms of practicing it and modifications thereto, those of ordinary skill in the art will understand that many other modifications can be made to the disclosed embodiments within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for maximizing an operating efficiency of an inductively coupled plasma (ICP) torch in which a plasma is generated, comprising the steps of:

(a) specifying a gaseous fluid used to generate the plasma;

(b) as a function of the gaseous fluid used to generate the plasma, modeling the ICP torch to determine an optimal flow rate of the gaseous fluid and an optimal power level for energizing an induction coil of the ICP torch to generate the plasma; and (c) operating the ICP torch with the optimal flow rate of the gaseous fluid, and with the optimal power level applied to energize the induction coil of the ICP torch, so that the efficiency of the ICP torch is substantially maximized.

2. The method of claim 1, further comprising the step of monitoring a parameter that is a function of the operating efficiency of the ICP torch, to produce a signal indicative of said operating efficiency.

3. The method of claim 2, further comprising the step of employing said signal indicative of the operating efficiency of the ICP torch to adjust one of the power level applied to the induction coil of the ICP torch and the flow rate of the gaseous fluid, to further maximize the operating efficiency of the ICP torch.

4. The method of claim 3, further comprising the step of employing the signal indicative of the operating efficiency of the ICP torch to adjust the other of the power level applied to the induction coil of the ICP torch and the flow rate of the gaseous fluid, to still further maximize the operating efficiency of the ICP torch.

5. The method of claim 1, wherein the gaseous fluid comprises $CO_2$.

6. The method of claim 1, wherein the step of modeling is also based upon fixed parameters, including a length and radius of the ICP torch, and a frequency of power applied to operate the ICP torch.

7. A method for maximizing a product yield from a reaction vessel in which plasma gas from an inductively coupled plasma (ICP) torch reacts with a feedstock material in a reaction vessel, comprising the steps of:

(a) specifying a gaseous fluid used to generate the plasma;

(b) specifying a feedstock material;

(c) as a function of a gaseous fluid used to generate the plasma, modeling the ICP torch to determine an optimal flow rate of the gaseous fluid used to generate the plasma and an optimal power level for energizing an induction coil of the ICP torch to generate the plasma;

(d) operating the ICP torch with the optimal flow rate of the gaseous fluid and with the optimal power level applied to the induction coil of the ICP torch, so that the efficiency of the ICP torch is substantially maximized; and (e) adjusting the flow rate of the feedstock material, so that the product yield is substantially maximized.

8. The method of claim 7, further comprising the steps of adding additional gaseous fluid to the reaction vessel in which the plasma is injected, said additional gaseous fluid being supplied as necessary to completely process all of the feedstock material.

9. The method of claim 7, further comprising the step of monitoring the product temperature and yield output from the reaction vessel to produce signals indicative of said product temperature and yield.

10. The method of claim 9, further comprising the step of adjusting at least one of the power level applied to the induction coil, the flow rate of the gaseous fluid into the ICP torch, and the flow rate of the gaseous fluid into the reaction vessel, to further optimize the yield of the thermal chemical conversion process in the reaction vessel.

11. The method of claim 10, further comprising the step of selectively giving priority either to optimizing the operation of the ICP torch or optimizing the product yield of the reaction vessel.

12. A method for using $CO_2$ both as a chemical reactant and for producing a thermal plasma to convert a feedstock material into a tailored gas composition within a reaction vessel, comprising the steps of:

(a) providing a plasma generator, a variable $CO_2$ gas supply system, a variable power supply connected to energize the plasma generator, a reaction vessel having an inlet adapted to receive a thermal plasma produced by said plasma generator and an outlet from which a product is output, and a variable feedstock supply system adapted to inject said feedstock material into said reaction vessel;

(b) supplying $CO_2$ to the plasma generator so that the plasma generator ionizes the $CO_2$ to produce ionized $CO_2$ that is the thermal plasma;

(c) injecting the ionized $CO_2$ from the plasma generator into the reaction vessel to simultaneously provide heat and a reactant; and (d) injecting the feedstock material into the reaction vessel to react with the ionized $CO_2$, said ionized $CO_2$ thus serving both as the thermal plasma, which is a reaction heat source, and as a chemical reactant for processing the feedstock material.

13. The method of claim 12, wherein the variable $CO_2$ gas supply provides substantially pure $CO_2$.

14. The method of claim 12, wherein the variable $CO_2$ gas supply provides a $CO_2$ rich gas.

15. The method of claim 12, wherein the feedstock material comprises an organic material.

16. The method of claim 15, wherein the feedstock material comprises methane.

17. The method of claim 15, wherein the feedstock material comprises carbon.

18. The method of claim 15, wherein the desired product comprises a synthesis gas.

19. The method of claim 18, further comprising the step of injecting steam into the reaction vessel to selectively vary a proportion of $H_2$ to CO in the synthesis gas produced.

20. The method of claim 18, further comprising the step of injecting steam into the plasma generator to selectively vary a proportion of $H_2$ to CO in the synthesis gas produced.

21. The method of claim 12, wherein the feedstock material comprises hydrogen.

22. The method of claim 12, wherein the feedstock material comprises a solid, particulate form.

23. The method of claim 12, wherein the feedstock material comprises a liquid before being injected into the reaction vessel.

24. The method of claim 12, wherein the feedstock material comprises a gas before being injected into the reaction vessel.

25. The method of claim 12, wherein the feedstock material comprises any combination of a solid, a liquid, and a gas before being injected into the reaction vessel.

26. The method of claim 12, further comprising the step of mixing a portion of said feedstock material with said $CO_2$ before ionization of the $CO_2$ by the plasma generator.

27. The method of claim 12, further comprising the step of mixing substantially all of said feedstock material with the $CO_2$ before ionization of the $CO_2$ by the plasma generator.

28. The method of claim 12, further comprising the step of injecting a portion of the $CO_2$ into the reaction vessel as a non-ionized reactant, said portion of the $CO_2$ being supplied in sufficient quantity to completely react said feedstock material.

29. The method of claim 12, further comprising the step of providing a controller coupled to and able to selectively control at least one of the variable $CO_2$ gas supply system, the variable power supply, and the variable feedstock supply system.

30. The method of claim 29, wherein the plasma generator is an inductively coupled plasma (ICP) torch.

31. The method of claim 30, further comprising the steps of:

(a) modeling the ICP torch to determine an optimal $CO_2$ plasma gas flow rate and power level to maximize an efficiency of the ICP torch; and (b) with the controller, controlling said variable $CO_2$ gas supply system to provide said optimal $CO_2$ plasma gas flow rate, and controlling said variable power supply to provide said optimum power level to energize the ICP torch.

32. The method of claim 30, wherein the controller includes a processor, comprising the steps of:

(a) monitoring the ICP torch efficiency, producing a signal indicative of the ICP torch efficiency that is conveyed to the processor; and (b) automatically varying said $CO_2$ plasma gas flow rate and said power level with the processor as a function of the signal, to maintain an optimal torch efficiency.

33. The method of claim 31, further comprising the steps of:

(a) injecting a portion of the $CO_2$ into the reaction vessel, in a non-ionized state;

(b) as a function of a reaction between the ionized $CO_2$ produced by the ICP torch, the feedstock material, and any non-ionized $CO_2$ gas injected into the reaction vessel, determining desired flow rates for the feedstock material and any non-ionized $CO_2$ gas flow into the reaction vessel required to substantially maximize a product yield from the reaction vessel; and (c) controlling said feedstock material and a flow of said non-ionized $CO_2$ injected into the reaction vessel with the controller to provide the desired flow rates, so that the product yield from the reaction vessel is maximized.

34. The method of claim 30, wherein the controller includes a processor, further comprising the steps of:

(a) monitoring the product yield from the reaction vessel, producing a signal indicative of the product yield; and (b) providing a software program to control the processor so that it automatically varies the feedstock material feed rate and the non-ionized $CO_2$ gas flow rate into the reaction vessel to optimize product yield based on the signal.

35. The method of claim 34, further comprising the steps of:

(a) as a function of the reaction between the ionized $CO_2$, the organic feed, and any non-ionized $CO_2$ gas injected into the reaction vessel, determining an optimal $CO_2$ plasma gas flow rate and an optimum power level that substantially maximizes a product yield from the reaction vessel; and (b) providing a software program for execution by the processor that causes it to monitor and automatically vary the $CO_2$ gas flow rate and power level so as to substantially maximize the product yield from the reaction vessel, even if $CO_2$ gas flow rate and power level used by the processor result in a non optimal ICP torch efficiency.

36. The method of claim 35, further comprising the step of selectively giving priority to the processor for optimizing either the operating efficiency of the ICP torch, or the product yield from the reaction vessel.

37. Apparatus for converting a feedstock material into a tailored gas composition using $CO_2$ as both a chemical reactant with the feedstock material, and for producing a thermal plasma in a reaction vessel, comprising:

(a) a plasma generator capable of sustained production of a plasma, said plasma generator having an inlet port, an outlet port, and a heat sink that maintains an internal surface of the plasma generator below a predetermined maximum temperature, said plasma generator being connected to a variable power supply to energize the plasma generator;

(b) a variable $CO_2$ gas supply system that provides $CO_2$ gas to be ionized by the plasma generator, producing ionized $CO_2$ for the thermal plasma;

(c) a reaction vessel coupled to the outlet port of the plasma generator to receive the thermal plasma, said reaction vessel containing at least one injection port through which a feedstock material is injected into the thermal plasma, said at least one injection port being connected to a variable feedstock supply system; and (d) an outlet port from said reaction vessel adapted to convey a high temperature product of a reaction between the feedstock material and the ionized $CO_2$ from the reaction vessel, said product being produced by a reaction between the ionized $CO_2$ and the feedstock material using energy from the thermal plasma to promote the reaction.

38. The apparatus of claim 37, wherein said at least one injection port into the reaction vessel is configured to produce a tangential injection pattern.

39. The apparatus of claim 38, wherein said at least one injection port into the reaction vessel further comprises at least one additional injection port, said at least one additional injection port being configured to tangentially inject a reactant in a substantially opposing direction to said tangential injection pattern produced by said at least one injection port, such that the reactant from said at least one injection port intersects the reactant from said at least one additional injection port, thereby promoting turbulence in the reaction vessel.

40. The apparatus of claim 37, wherein said at least one injection port into the reaction vessel is configured to produce a radial injection pattern.

41. The apparatus of claim 37, wherein said at least one injection port into the reaction vessel is configured to produce a countercurrent injection pattern.

42. The apparatus of claim 37, further comprising an acid removal system connected to the outlet port of the reaction vessel, to remove an acid contamination from the tailored gas composition.

43. The apparatus of claim 37, further comprising a variable steam supply system adapted to inject steam into the reaction vessel, to selectively vary a proportion of CO to $H_2$ in the tailored gas composition.

44. The apparatus of claim 43, further comprising a heat exchanger adapted to use heat from the tailored gas composition exiting said reaction vessel to preheat at least one of said $CO_2$, said feedstock material, and said steam.

45. The apparatus of claim 37, wherein said feedstock material is mixed with said $CO_2$ gas and supplied to the inlet port of said plasma generator.

46. The apparatus of claim 37, further comprising a member disposed in said reaction vessel to produce turbulence, said turbulence promoting thorough mixing of said feedstock material and said ionized $CO_2$.

47. The apparatus of claim 46, wherein the feedstock material is injected into the reaction vessel at an area of said turbulence caused by said member.

48. The apparatus of claim 37, wherein the plasma generator is an inductively coupled plasma (ICP) torch and the power supply is adapted to provide an alternating current to energize the ICP torch.

49. The apparatus of claim 48, further comprising a plurality of ICP torches connected to said reaction vessel, each of said plurality of ICP torches being coupled to the variable power supply and in fluid communication with the variable $CO_2$ gas supply system, to produce the ionized $CO_2$.

50. The apparatus of claim 49, further comprising a controller connected to selectively control the variable $CO_2$ gas supply system, the power supply, and the feedstock supply system.

51. The apparatus of claim 50, further comprising at least one sensor disposed at said outlet port from said reaction vessel to determine a product yield, said sensor producing a signal indicative of the product yield that is input to said controller.

52. The apparatus of claim 51, further comprising a temperature sensor disposed at said outlet port to determine a product temperature, said temperature sensor producing a signal indicative of the product temperature that is input to said controller.

53. The apparatus of claim 52, further comprising a temperature sensor disposed at said heat sink to monitor a temperature of said heat sink and produce a signal indicative thereof that is input to said controller, said temperature and a level of current supplied to energize said ICP torch by said power supply being used by the controller to determine said ICP torch efficiency.

54. The apparatus of claim 53, wherein said controller includes a processor programmed to maximize ICP torch efficiency by selectively varying at least one of the gas flow rate from said $CO_2$ gas supply system to the ICP torch and the level of current supplied to energize said ICP torch by said power supply.

55. The apparatus of claim 54, wherein said variable $CO_2$ gas supply system also injects a non-ionized $CO_2$ gas flow into said reaction vessel, said processor being programmed to maximize reaction efficiency by selectively varying at least one of said $CO_2$ gas flow rate into the ICP torch, said current supplied by the power supply to energize the ICP torch, said non-ionized $CO_2$ gas flow, and said organic feed provided by said organic feed supply system.

56. The apparatus of claim 55, wherein the processor is programmed to allow an operator to selectively set a priority on either maximizing the ICP torch efficiency, or maximizing the product yield from the reaction vessel, or maximizing a different selected parameter.

* * * * *

UNITED STATES PATENT AND TRADEMARK OFFICE

CERTIFICATE OF CORRECTION

PATENT NO. : 6,153,852
DATED : November 28, 2000
INVENTOR(S) : Blutke et al.

It is certified that error appears in the above-identified patent and that said Letters Patent is hereby corrected as shown below:

Title page,
Item [73], Assignee, please add -- Assignee: Thermal Conversion Corp., Richland, WA --

Column 10,
Line 6, "an" should read -- a --.

Signed and Sealed this

Fifth Day of February, 2002

*Attest:*

JAMES E. ROGAN
*Director of the United States Patent and Trademark Office*

*Attesting Officer*